US010754523B2

(12) United States Patent
Leem

(10) Patent No.: US 10,754,523 B2
(45) Date of Patent: Aug. 25, 2020

(54) RESIZING OF IMAGES WITH RESPECT TO A SINGLE POINT OF CONVERGENCE OR DIVERGENCE DURING ZOOMING OPERATIONS IN A USER INTERFACE

(71) Applicant: International Business Machines Corporation, Armonk, NY (US)

(72) Inventor: Jin Leem, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 15/823,377

(22) Filed: Nov. 27, 2017

(65) Prior Publication Data
US 2019/0163352 A1    May 30, 2019

(51) Int. Cl.
*G06F 3/048*    (2013.01)
*G06F 3/0484*   (2013.01)
*G06F 3/0488*   (2013.01)

(52) U.S. Cl.
CPC ........ *G06F 3/04845* (2013.01); *G06F 3/0488* (2013.01); *G06F 3/04886* (2013.01); *G06F 2203/04806* (2013.01)

(58) Field of Classification Search
CPC .......................................... G06F 3/0481–0489
See application file for complete search history.

(56) References Cited

U.S. PATENT DOCUMENTS

| 5,555,354 | A  | * | 9/1996  | Strasnick  | G06F 3/04815 345/427 |
| 5,671,381 | A  | * | 9/1997  | Strasnick  | G06F 3/04815 345/426 |
| 5,877,775 | A  | * | 3/1999  | Theisen    | G06F 3/04815 345/440 |
| 6,166,738 | A  | * | 12/2000 | Robertson  | G06F 3/04815 345/427 |
| 6,243,093 | B1 | * | 6/2001  | Czerwinski | G06F 3/04815 715/848 |
| 6,253,218 | B1 | * | 6/2001  | Aoki       | G06T 15/10 715/201 |
| 7,292,243 | B1 | * | 11/2007 | Burke      | G09B 5/00 345/440 |
| 7,336,279 | B1 | * | 2/2008  | Takiguchi  | G06F 16/9024 345/473 |

(Continued)

OTHER PUBLICATIONS

Smith et al.; "The Radial Scroll Tool: Scrolling Support For Stylus-Or Touch-Based Document Navigation", UIST'04 17th Annual ACM Symposium On, Oct. 24-27, 2004, pp. 53-56.

(Continued)

*Primary Examiner* — Steven B Theriault
(74) *Attorney, Agent, or Firm* — Rabindranath Dutta; Konrad, Raynes, Davda and Victor LLP

(57) ABSTRACT

A graphical user interface controlling application executing in a computational device performs operations in which in response to displaying images of a first plurality of elements rendered in a first size surrounded by images of a second plurality of elements rendered in a second size that is smaller than the first size, a request to zoom in is received. In response to receiving the request to zoom in, one or more images are erased, and images of the second plurality of elements rendered in the first size are displayed.

16 Claims, 10 Drawing Sheets

(56) References Cited

U.S. PATENT DOCUMENTS

| | | | | |
|---|---|---|---|---|
| 7,340,678 B2* | 3/2008 | Chiu | G06F 3/04815 | 715/734 |
| 7,590,948 B2* | 9/2009 | Narita | G06F 3/0482 | 715/810 |
| 7,707,503 B2* | 4/2010 | Good | G06F 3/0481 | 715/730 |
| 7,716,604 B2* | 5/2010 | Kataoka | G06F 3/0481 | 715/757 |
| 7,752,565 B2* | 7/2010 | Bombolowsky | G06F 3/0481 | 715/766 |
| 7,958,451 B2* | 6/2011 | Ishida | G06F 16/954 | 715/738 |
| 7,986,324 B2* | 7/2011 | Funaki | G06F 3/04815 | 345/440 |
| 8,010,900 B2* | 8/2011 | Hart | G06F 11/1448 | 715/747 |
| 8,166,415 B2* | 4/2012 | Cisler | G06F 3/0481 | 715/778 |
| 8,174,523 B2* | 5/2012 | Higuchi | G06F 3/0483 | 345/418 |
| 8,223,172 B1* | 7/2012 | Miller | G06F 3/0481 | 345/660 |
| 8,237,714 B1* | 8/2012 | Burke | G09B 5/00 | 345/440 |
| 8,274,508 B2 | 9/2012 | Porikli et al. | | |
| 8,319,772 B2* | 11/2012 | Fong | G01C 21/3673 | 345/419 |
| 8,332,782 B1 | 12/2012 | Chang et al. | | |
| 8,352,465 B1* | 1/2013 | Jing | G06F 16/54 | 707/723 |
| 8,375,312 B2* | 2/2013 | Marinkovich | G06F 16/54 | 715/762 |
| 8,527,899 B2* | 9/2013 | Miyazawa | H04N 5/44543 | 715/784 |
| 8,533,580 B1* | 9/2013 | Xu | G06F 3/04815 | 715/205 |
| 8,587,617 B2* | 11/2013 | Hoff | G06F 3/0488 | 340/995.15 |
| 8,681,149 B2* | 3/2014 | Fong | G01C 21/3673 | 345/419 |
| 8,707,211 B2 | 4/2014 | Yasui et al. | | |
| 9,007,302 B1 | 4/2015 | Bandt-Horn | | |
| 9,058,403 B2* | 6/2015 | Jung | G06F 16/9577 | |
| 9,098,516 B2* | 8/2015 | Jones | G06F 3/04815 | |
| 9,170,722 B2* | 10/2015 | Watanabe | G06F 3/0485 | |
| 9,251,166 B2* | 2/2016 | Grandhi | G06F 16/9024 | |
| 9,274,680 B2* | 3/2016 | Morillon | G06F 3/04815 | |
| 9,405,503 B2* | 8/2016 | Roos | G06F 15/16 | |
| 9,576,033 B2* | 2/2017 | Barrett | G06F 16/248 | |
| 9,576,049 B2* | 2/2017 | Macbeth | G06F 3/04815 | |
| 9,594,493 B2 | 3/2017 | Otero Diaz et al. | | |
| 9,632,662 B2 | 4/2017 | Chmielewski et al. | | |
| 9,654,654 B1* | 5/2017 | Jing | G06F 16/444 | |
| 10,261,661 B2* | 4/2019 | Ramanathan | G06T 11/206 | |
| 2002/0032696 A1* | 3/2002 | Takiguchi | G06F 16/9024 | 715/255 |
| 2002/0033849 A1* | 3/2002 | Loppini | G06F 3/04815 | 715/848 |
| 2002/0140698 A1* | 10/2002 | Robertson | G06F 3/04815 | 345/427 |
| 2004/0056861 A1* | 3/2004 | Huber | G06T 3/40 | 345/428 |
| 2004/0109006 A1* | 6/2004 | Matthews | G06F 9/451 | 345/619 |
| 2004/0141014 A1* | 7/2004 | Kamiwada | G06F 3/04815 | 715/848 |
| 2006/0193538 A1* | 8/2006 | Vronay | G06F 16/54 | 382/305 |
| 2007/0070066 A1* | 3/2007 | Bakhash | G06F 3/04815 | 345/419 |
| 2007/0109297 A1* | 5/2007 | Borchardt | G06F 3/04815 | 345/419 |
| 2008/0098311 A1* | 4/2008 | Delarue | G06F 16/54 | 715/739 |
| 2008/0235628 A1* | 9/2008 | Faught | G06F 3/04815 | 715/848 |
| 2009/0006993 A1* | 1/2009 | Tuli | G06F 3/0482 | 715/764 |
| 2009/0182500 A1* | 7/2009 | Dicke | G01C 21/00 | 701/532 |
| 2009/0327969 A1* | 12/2009 | Estrada | G06F 3/04815 | 715/848 |
| 2010/0054703 A1* | 3/2010 | Tanaka | H04N 5/44543 | 386/241 |
| 2011/0316884 A1* | 12/2011 | Giambalvo | G06F 3/04815 | 345/660 |
| 2012/0019513 A1* | 1/2012 | Fong | G01C 21/3673 | 345/419 |
| 2012/0036459 A1* | 2/2012 | Pei | G06F 3/04815 | 715/765 |
| 2012/0036466 A1* | 2/2012 | Venon | G06F 3/0482 | 715/772 |
| 2012/0042283 A1* | 2/2012 | Tuesta | G06F 3/0482 | 715/834 |
| 2012/0110501 A1* | 5/2012 | Baek | G06F 3/0481 | 715/800 |
| 2012/0223936 A1* | 9/2012 | Aughey | G06F 3/04815 | 345/419 |
| 2013/0166997 A1* | 6/2013 | Hadley | G06F 16/907 | 715/202 |
| 2013/0167015 A1* | 6/2013 | Hadley | G06F 3/0481 | 715/243 |
| 2013/0167016 A1* | 6/2013 | Hadley | G06F 16/907 | 715/243 |
| 2013/0326398 A1* | 12/2013 | Zuverink | G06F 3/048 | 715/784 |
| 2013/0332871 A1* | 12/2013 | Bucur | G06T 19/00 | 715/768 |
| 2014/0168205 A1 | 6/2014 | Naveh et al. | | |
| 2015/0040052 A1 | 2/2015 | Noel et al. | | |
| 2015/0193446 A1* | 7/2015 | Barnett | G06F 16/444 | 715/234 |
| 2015/0331555 A1 | 11/2015 | Keondjian et al. | | |
| 2016/0019668 A1 | 1/2016 | Kilinski | | |
| 2016/0202892 A1* | 7/2016 | Rath | G06F 3/04847 | 715/764 |
| 2017/0003839 A1* | 1/2017 | Van Laack | G06F 3/0482 | |
| 2017/0098318 A1 | 4/2017 | Iannaccone et al. | | |
| 2017/0192627 A1 | 7/2017 | Agnoli et al. | | |
| 2018/0349413 A1* | 12/2018 | Shelby | G01C 21/3638 | |

OTHER PUBLICATIONS

Sheth et al.; "Visualizing MeSH Dataset Using Radial Tree Layout", Indiana University, Apr. 29, 2003, pp. 1-11.

Dixit et al.; "Visualizing Etymology: A Radial Graph Displaying Derivations And Origins", Stanford University, CS448B, 2011, pp. 16.

Microsoft, "Bubble And Scatter Charts In Power View", dated 2017, (online), retrieved from the internet at URL>https://support.office.com/en-us/article/Bubble-and-scatter-charts-in-Power-View-bae . . . , Total 6 pages.

List of IBM Patents or Patent Applications Treated as Related, dated Dec. 21, 2017, pp. 2.

US Patent Application, dated Dec. 21, 2017, for U.S. Appl. No. 15/851,339 (137.03C1), filed Dec. 21, 2017, invented by Jin Leem, Total 33 pages.

Preliminary Amendment, dated Dec. 21, 2017, for U.S. Appl. No. 15/851,339 (137.03C1), filed Dec. 21, 2017, invented by Jin Leem, Total 6 pages.

Office Action, dated Sep. 6, 2019, for U.S. Appl. No. 15/851,339 (137.03C1), filed Dec. 21, 2017, invented by Jin Leem, Total 21 pages.

Response to Office Action, dated Dec. 6, 2019, for U.S. Appl. No. 15/851,339 (137.03C1), filed Dec. 21, 2017, invented by Jin Leem, Total 8 pages.

(56) References Cited

OTHER PUBLICATIONS

Final Office Action1, dated Jan. 8, 2020, for U.S. Appl. No. 15/851,339 (137.03C1), filed Dec. 21, 2017, invented by Jin Leem, Total 14 pages.
Response to Final Office Action, dated Apr. 7, 2020, for U.S. Appl. No. 15/851,339 (137.03C1), filed Dec. 21, 2017, invented by Jin Leem, Total 8 pages.
Notice of Allowance, dated Apr. 20, 2020, for U.S. Appl. No. 15/851,339, filed Dec. 21, 2017, invented by Jin Leem, Total 15 pages.

* cited by examiner

RESIZING OF IMAGES WITH RESPECT TO A SINGLE POINT OF CONVERGENCE OR DIVERGENCE DURING ZOOMING OPERATIONS IN A USER INTERFACE

BACKGROUND

1. Field

Embodiments relate to resizing of images with respect to a single point of convergence or divergence during zooming operations in a user interface.

2. Background

A graphical user interface (GUI), is a type of user interface that allows users to interact with electronic devices through graphical icons and visual indicators that are displayed on a display screen. In non-touchscreen type of display screens, the actions in a GUI are usually performed through manipulation of the graphical elements by movements of a peripheral device such as a computer mouse, a pointing device, etc.

In touchscreen type of display screens, the actions in a GUI may also be performed through manipulation of the graphical elements or empty areas of the display screen by a stylus or via one or more fingers of a user, or via other mechanisms. A user may provide input or control the elements displayed on the GUI through simple or multi-touch gestures by touching the touchscreen with a stylus or one or more fingers. The user may also use the touchscreen to react to what is displayed and control how it is displayed. For example, a user may perform zooming to increase the text size of displayed content.

Spatial zooming for navigating content displayed in a GUI may allow a user to have a better view of the content, and may allow the user to determine how certain types of content relate to other types of content. For example US Patent Application Publication 2015/0331555 provides mechanisms for navigating content displayed in a GUI.

SUMMARY OF THE PREFERRED EMBODIMENTS

Provided are a method, a system, a computer program product in which a graphical user interface controlling application executing in a computational device performs operations in which in response to displaying images of a first plurality of elements rendered in a first size surrounded by images of a second plurality of elements rendered in a second size that is smaller than the first size, a request to zoom in is received. In response to receiving the request to zoom in, one or more images are erased, and images of the second plurality of elements rendered in the first size are displayed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In computing, a zoom function may be used by a user to change the scale of a viewed area on a display window, in order to see more detail or less detail, and browse through different objects, such as, documents or images. A zoom in function may magnify an area and show the area in greater detail, whereas a zoom out function may demagnify the area and show fewer details of the area.

Certain embodiments provide improvements to the operation of a computational device by providing a graphical user interface controlling application that implements an improvement to the zoom function. In the improved zoom function, in response to a zoom in request from a user, a plurality of objects displayed in the peripheral regions of a display window are moved towards a vanishing point of the display window as the objects increase in size. The vanishing point may correspond to the center of the display window. In certain embodiments, a user may use a finger to touch a zoom selector icon on a touchscreen device and request the zoom in operation to be performed. In response, the graphical user interface controlling application may perform the zoom in on the displayed objects via the improved zoom function. As a result, objects are displayed in a larger size as the objects move towards the center of a display screen. The improvements to the operations of the computational device allow a user to perform radial navigation in association with zoom in and zoom out on objects displayed in the display screen of the computational device.

In additional embodiments, data structures used by the graphical user interface controlling application to implement the improved zoom function are provided.

EXEMPLARY EMBODIMENTS

Figure 1:
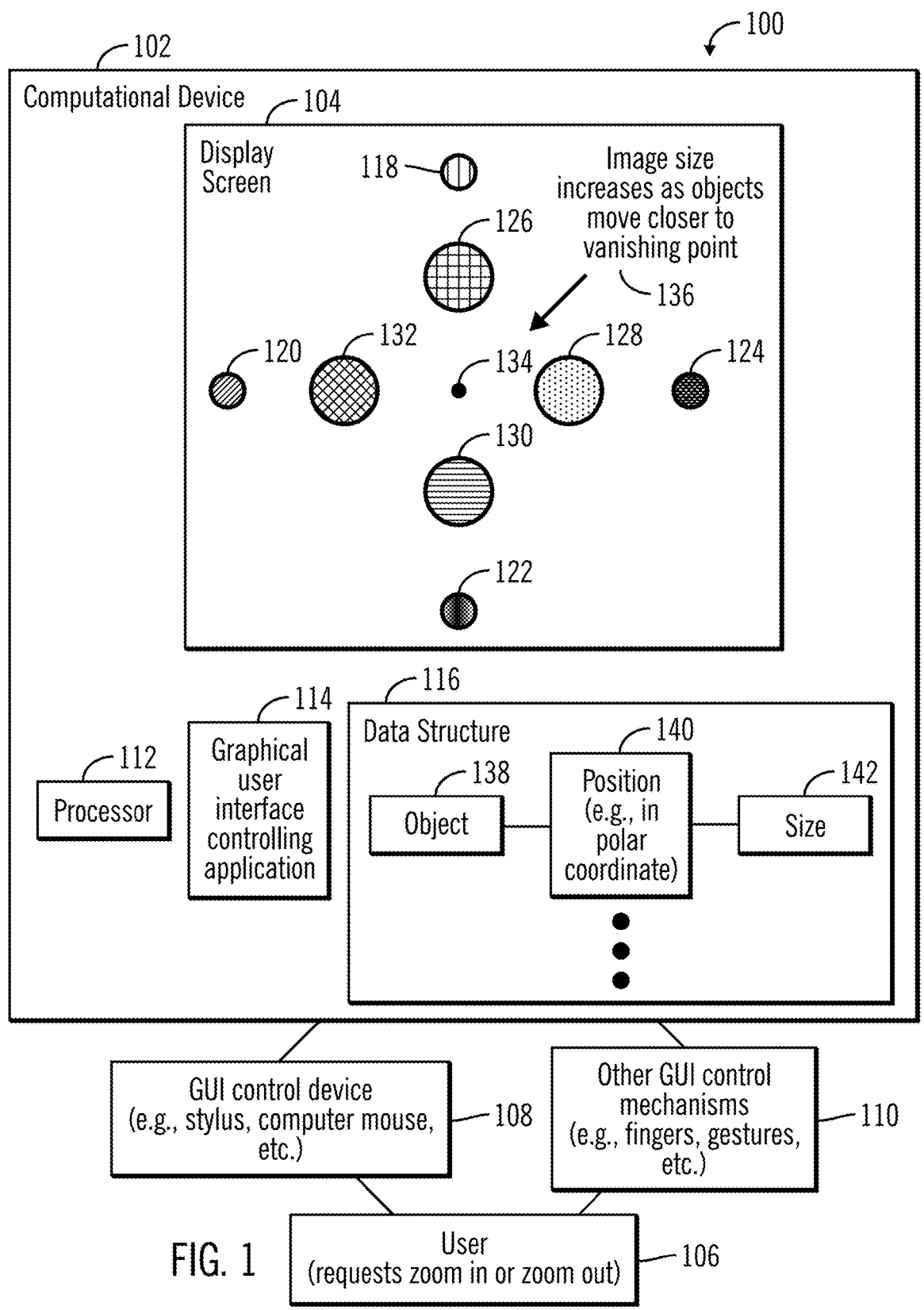
FIG. 1 illustrates a block diagram of a computing environment comprising a computational device with a display screen on which images of elements are displayed, in accordance with certain embodiments.

FIG. 1 illustrates a block diagram of a computing environment 100 comprising a computational device 102 with a display screen 104 on which images of elements are displayed, in accordance with certain embodiments.

The computational device 102 may comprise any suitable computational device including those presently known in the art, such as, hand held computer, a smartphone, a telephony device, a tablet computer, a palm top computer, a personal computer, a workstation, a server, a mainframe, a network appliance, a blade computer, a processing device, a controller, etc. The computational device 102 may be coupled to any suitable network, such as, a local area network, the Internet, an intranet, etc. In certain embodiments, computational device 102 may be an element in a cloud computing environment.

The display screen 104 may comprise a touchscreen enabled display screen or a non-touchscreen enabled display device. A user 106 may interact with elements displayed on the display screen 104 via a GUI control device 108, such as a stylus, a computer mouse, etc. The user 106 may also interact with elements displayed on the display screen 104 via other GUI control mechanisms 110, such as, by touching the display screen 104 with a finger or by performing gestures captured by sensors of the computational device 102.

The computational device 102 may include a processor 112, where a graphical user interface controlling application 114 may use data structures 116 stored in the computational device 102 to execute operations on the processor 112 to control the items (also referred to as objects or elements) displayed on the display screen 104.

In certain embodiments, the graphical user interface controlling application 114 displays the images of a plurality of objects or elements (e.g., images of objects 118, 120, 122, 124, 126, 128, 130, 132) on the display screen 104. The image size of objects displayed on the display screen 104 increases as objects move closer to the vanishing point 134 (as shown via the arrow indicated via reference numeral 136).

The data structure 116 may store for each object displayed on the display screen 104, the position and size (as shown via reference numerals 138, 140, 142). In certain embodiments, the position may be stored in a polar coordinate system.

In certain embodiments, the user 106 may request a zoom in or zoom out of the objects displayed on the display screen 104 via the GUI control device 108 or via the other GUI control mechanisms 110. In response, the graphical user interface controlling application 114 may perform the zoom in or zoom out of the objects displayed in the display screen. During a zoom in, objects are moved towards the single vanishing point 134 (e.g., at the center or the display screen or at the center of a display window) and increased in size. The vanishing point 134 may comprise the origin of a polar coordinate system in which the position of the objects are maintained.

Figure 2:
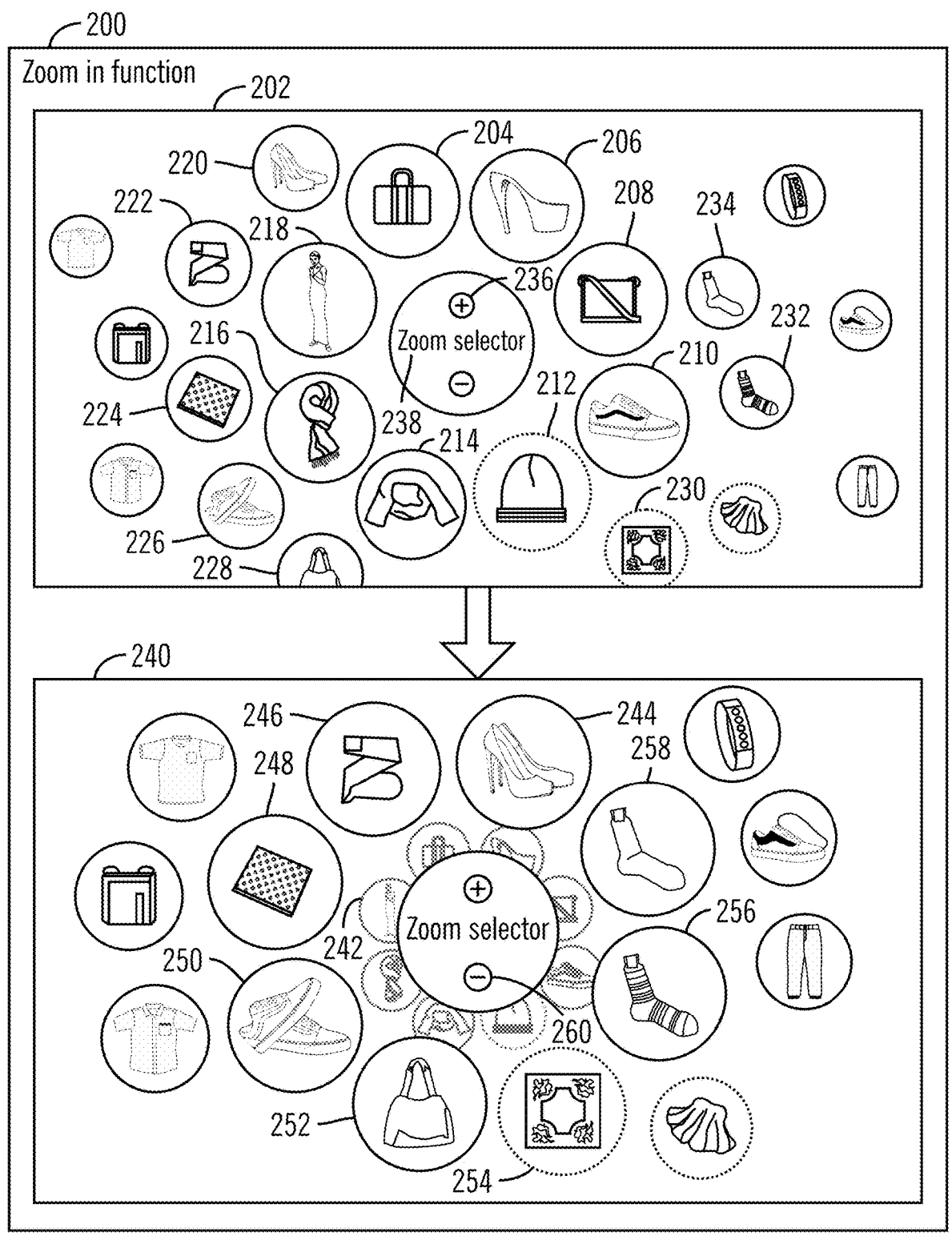
FIG. 2 illustrates a block diagram that shows a zoom in function performed by a graphical user interface controlling application, in response to a zoom in request from a user, in accordance with certain embodiments.

FIG. 2 illustrates a block diagram 200 that shows a zoom in function performed by a graphical user interface controlling application 114, in response to a zoom in request from a user 106, in accordance with certain embodiments.

Block 202 shows a plurality of objects 204, 206, 208, 210, 212, 214, 216, 218, 220, 222, 224, 226, 228, 230, 232, 234 and other objects displayed in the display screen 104. A user may touch the "+" indication 236 displayed on the zoom selector indication 238 to request a zoom in to be performed on the objects displayed in block 202. Other mechanisms such as moving two fingers inwards on the surface of the display screen 104 may also be used to perform the zoom in function.

In response to the request for the zoom in function to be performed, the graphical user interface controlling application 114 may perform a zoom in on the objects shown displayed in block 202 and an exemplary resulting display after the zoom in is shown in block 240.

In block 240, the objects 204, 206, 208, 210, 212, 214, 216, 218 are moved towards the center of the display screen and may be shown in a relatively lower contrast with a background color in comparison to other displayed images (e.g., by applying a fade-out effect). For example, object 218 of block 202 is shown via reference numeral 242 in block 240. The objects 204, 206, 208, 210, 212, 214, 216, 218 may be shown in a relatively lower contrast in block 240 after zoom in and may also be reduced in size. In certain alternative embodiments, the objects 204, 206, 208, 210, 212, 214, 216, 218 may not be displayed at all on the display screen 104. In certain embodiments the changes in size and contrast or color may appear to user as smooth or continuous change The zoom in also causes the objects 220, 222, 224, 226, 228, 230, 232, 234 to be enlarged and moved towards the center of the display screen and is shown via reference numerals 244, 246, 248, 250, 252, 254, 256, 258 in block 240.

Other objects are also moved inwards towards the center of the display screen and increased in size.

Therefore, FIG. 2 illustrates certain embodiments in which during a zoom in, the largest objects that are present closest to the center of the display screen are decreased in size and faded out, and smaller objects towards the periphery are enlarged and moved in towards the center of the display screen.

If the user chooses the "−" indication 260 on the zoom selector to indicate a zoom out, the objects displayed in block 240 revert back to the way the objects were previously displayed in block 202.

Therefore, FIG. 2 illustrates certain embodiments in which images of objects located towards the periphery of a display screen are enlarged as they move towards the center of the display screen, in response to a zoom in indication provided by a user. The largest sized images of objects located proximate to the center of the screen are reduced in size and displayed with a fade-out effect to make the reduced size images blend with the background.

Figure 3:
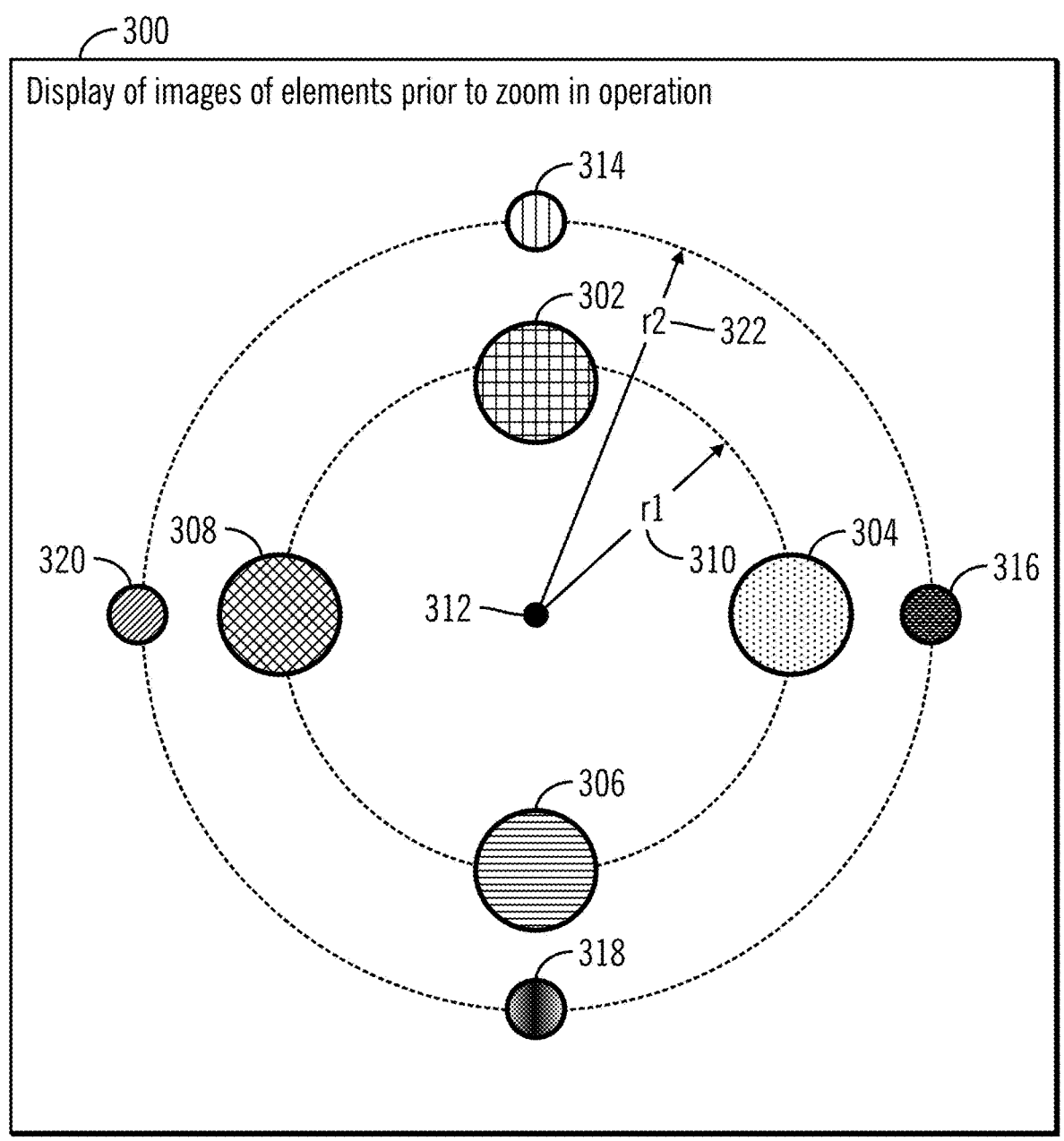
FIG. 3 illustrates a block diagram that shows an exemplary display of images of elements prior to a zoom in operation, in accordance with certain embodiments.

FIG. 3 illustrates a block diagram 300 that shows an exemplary display of images of elements prior to a zoom in operation, in accordance with certain embodiments. Images of a plurality of objects 302, 304, 306, 308 are displayed at a radial distance of r1 310 from the center 312 of the display screen 104. Images of a plurality of objects 314, 316, 318, 320 are displayed at a radial distance of r2 322 from the center 312 of the display screen 104. The size of the images of objects at the radial distance r2 322 is smaller than the size of the images of objects at the radial distance r1 310. The images of objects that are farther away from the center 312 are smaller in size than the images of objects that are closer to the center 312.

The user 106 may use the GUI control device 108 or other GUI control mechanisms 110 to request a zoom in on the display of images shown in block 300.

Figure 4:
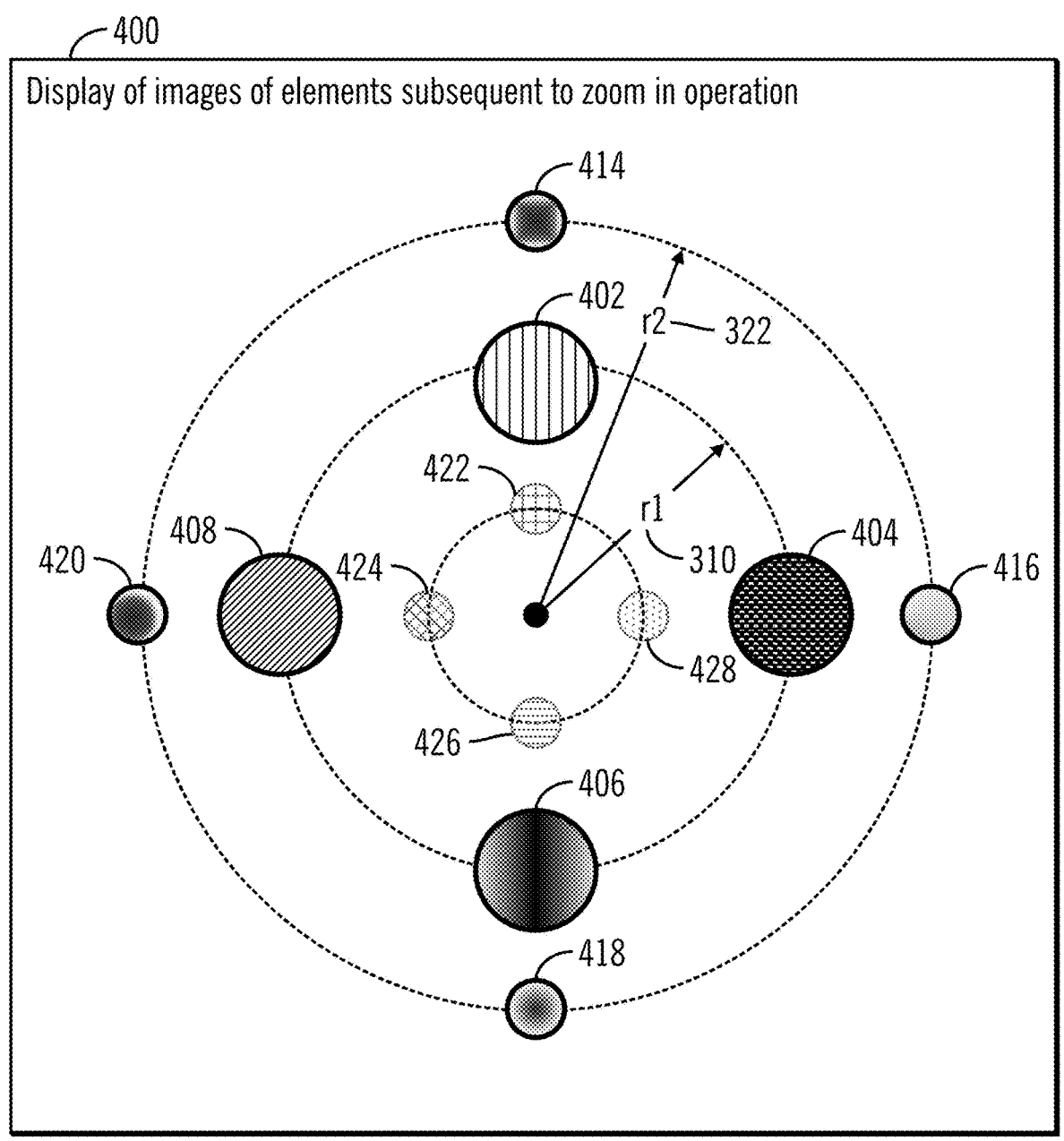
FIG. 4 illustrates a block diagram that shows an exemplary display of images of elements subsequent to a zoom in operation, in accordance with certain embodiments.

FIG. 4 illustrates a block diagram 400 that shows an exemplary display of images of elements subsequent to a zoom in operation performed on the display of images shown in FIG. 3, in accordance with certain embodiments.

In response to the zoom in operation, the graphical user interface controlling application 114 reduces the size of the images of objects 302, 304, 306, 308 and moves them radially inwards towards the center 312 and applies a fade-out effect on the images. The graphical user interface controlling application 114 enlarges the size of the images of objects 314, 316, 318, 320 and moves them radially inwards towards the center 312 from radial distance r2 322 to radial distance r1 310 (as shown via reference numerals 402, 404, 406, 408). Images of new objects not displayed earlier are shown at radial distance r2 322 (as shown via reference numerals 414, 416, 418, 420).

Therefore, FIGS. 3 and 4 illustrate certain embodiments in which images of objects are increased in size and moved radially inwards towards the center 312, in response to a zoom in operation requested by a user. The images of objects in the innermost circle of radius r1 310 are diminished in size and moved inwards towards the center 312 and displayed with a fade-out effect.

Figure 5:
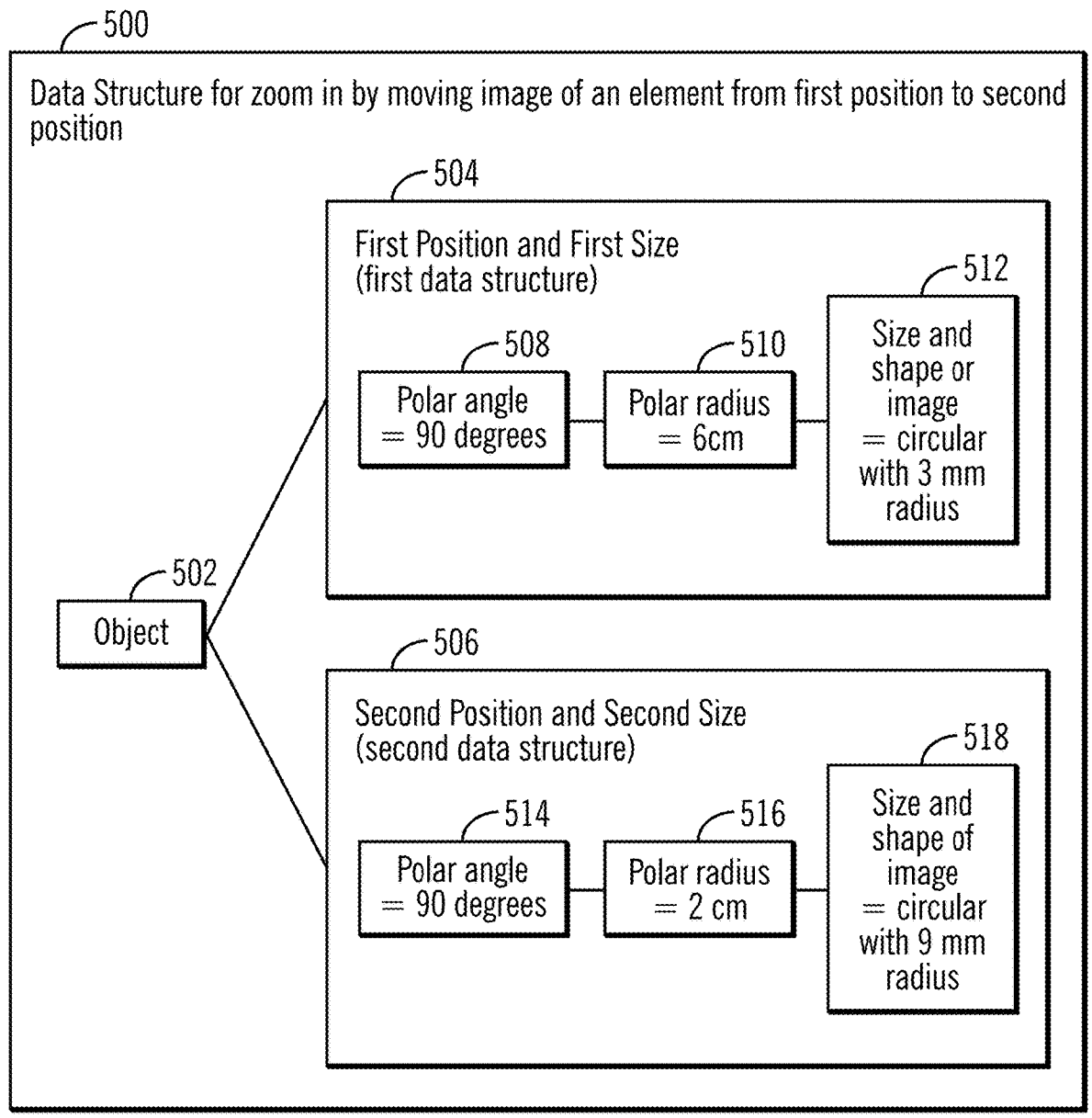
FIG. 5 illustrates a block diagram that shows data structures for performing zoom in operations by moving an image of an element from a first position to second position in the display screen, in accordance with certain embodiments.

FIG. 5 illustrates a block diagram 500 that shows data structures for performing zoom in by moving an image of an object from a first position to second position in the display screen 104, in accordance with certain embodiments.

Associated with each object 502 a first data structure 504 that shows the first position and first size of the image of the object 502, and a second data structure 506 that shows the second position and second size of the image of the object 502 are maintained.

The polar angle 508, the polar radius 510, and the size and shape of the image 512 at the first position are shown via the first data structure 504, and the polar angle 514, the polar radius 516, and the size and shape of the image 518 at the second position are shown via the second data structure 506.

The data structures shown in FIG. 5 are maintained and updated by the graphical user interface controlling application 114. In, FIG. 5 the position of the objects are shown via the polar angle and the polar radius. When an object is zoomed and moved inwards towards the center, the first data structure 504 represents the object prior to zooming, and the second data structure 506 represents the object subsequent to zooming and moving inwards towards the center.

In FIG. 5, the polar radius is reduced from 6 cm to 2 cm with the object moving inwards towards the center (shown via reference numeral 510, 516). The shape of the circular image of the object increases from 3 mm to 9 mm (as shown via reference numerals 512, 518). Since the polar angle remains the same (as shown via reference numerals 508, 514), the object is moved radially (i.e., moved along a radius) towards the center.

Figure 6:
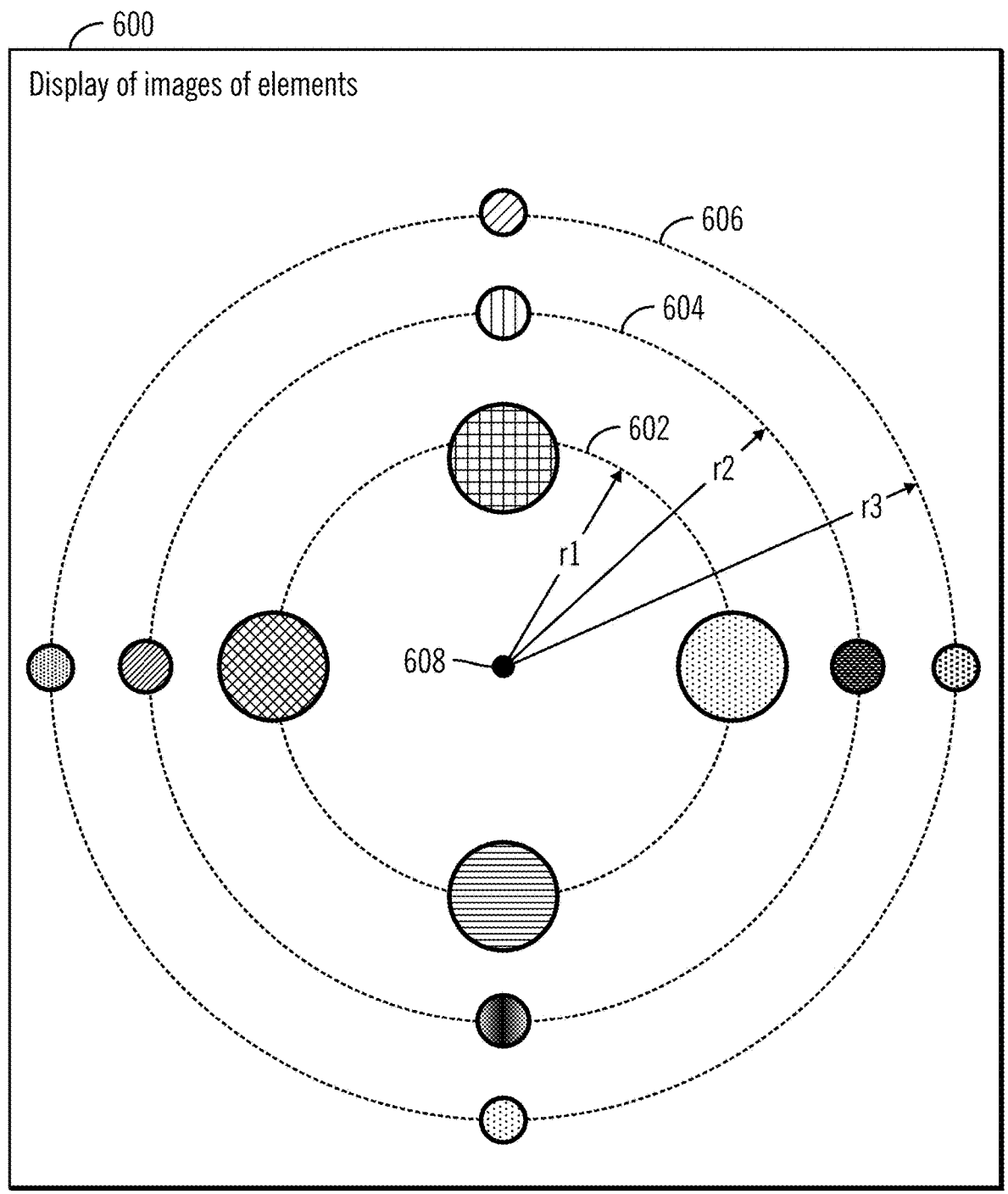
FIG. 6 illustrates a block diagram that shows an exemplary display of images of elements, wherein the images are positioned in three concentric circles, in accordance with certain embodiments.

FIG. 6 illustrates a block diagram 600 that shows an exemplary display of images of elements, wherein the images are position in three concentric circles 602, 604, 606 with radius r1, r2, r3 respectively, in accordance with certain embodiments.

The images of the objects decrease in size as the distance of the objects from the center 608 increases. In response to a zoom in operation, objects are increased in size and moved radially from the concentric circle 606 to the concentric circle 604. Objects in concentric circle 604 are increased in size and moved radially to the concentric circle 602. Objects in concentric circle 602 may disappear from view after the zoom in operation, or may be faded out after being diminished in size and moved inwards towards the center 608.

Figure 7:
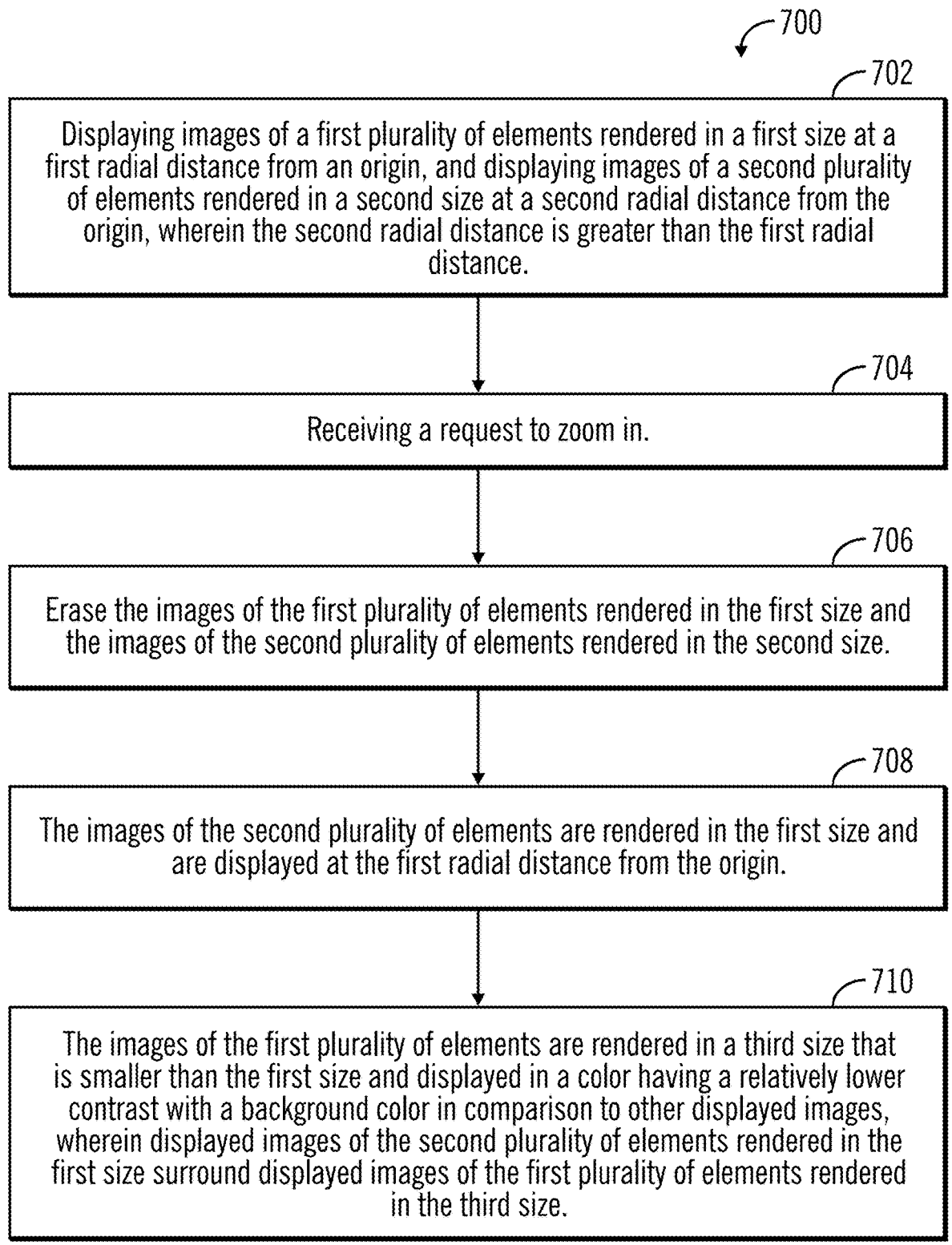
FIG. 7 illustrates a first flowchart that shows how images are moved and resized in response to a zoom in operation, in accordance with certain embodiments.

FIG. 7 illustrates a first flowchart 700 that shows how images are moved and resized in response to a zoom in operation, in accordance with certain embodiments. The operations shown in FIG. 7 may be performed by the graphical user interface controlling application 114 that executes in the computational device 102.

Control starts at block 702 in which the graphical user interface controlling application 114 performs the displaying of images of a first plurality of elements rendered in a first size at a first radial distance from an origin, and the displaying of images of a second plurality of elements rendered in a second size at a second radial distance from the origin, wherein the second radial distance is greater than the first radial distance.

Control proceeds to block 704 in which the graphical user interface controlling application 114 receives a request to zoom in. The graphical user interface controlling application 114 erases (at block 706) the images of the first plurality of elements rendered in the first size and the images of the second plurality of elements rendered in the second size.

From block 706 control proceeds to block 708 in which the graphical user interface controlling application 114 performs operations in which the images of the second plurality of elements are rendered in the first size and are displayed at the first radial distance from the origin. Control proceeds to block 710 in which the images of the first plurality of elements are rendered in a third size that is smaller than the first size and displayed in a color having a relatively lower contrast with a background color in comparison to other displayed images (e.g. via a fade-out effect), wherein displayed images of the second plurality of elements rendered in the first size surround displayed images of the first plurality of elements rendered in the third size. It should be noted that by displaying images in a color having a relatively lower contrast with a background color, the images are not visible as distinctly as earlier displayed images because the contrast of the images with the background color is lower than the contrast of the previously displayed images with the background color.

Figure 8:
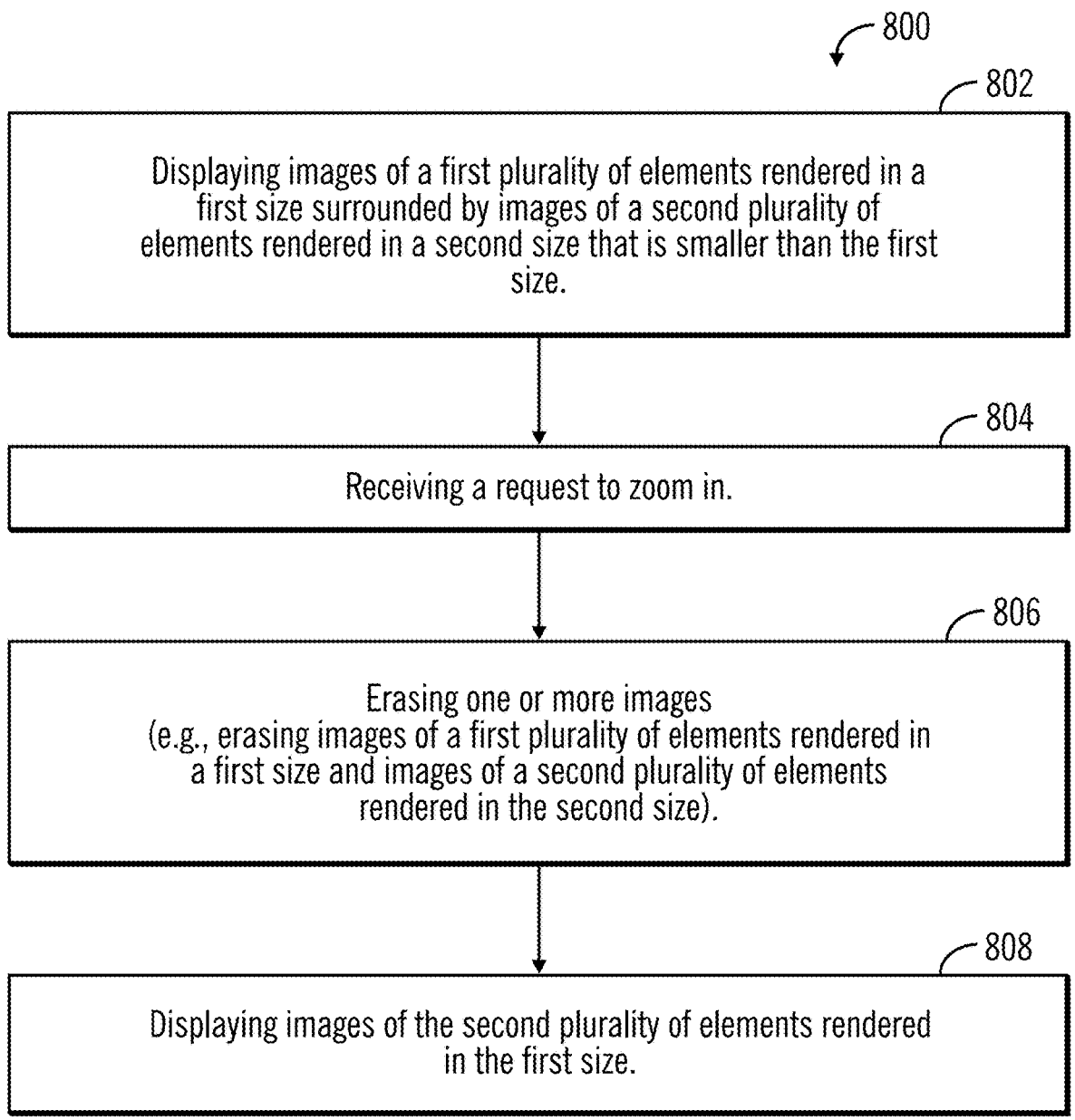
FIG. 8 illustrates a second flowchart that shows how images are moved and resized in response to a zoom in operation, in accordance with certain embodiments.

FIG. 8 illustrates a second flowchart 800 that shows how images are moved and resized in response to a zoom in operation, in accordance with certain embodiments. The operations shown in FIG. 8 may be performed by the graphical user interface controlling application 114 that executes in the computational device 102.

Control starts at block 802 in which the graphical user interface controlling application 114 performs the displaying of images of a first plurality of elements rendered in a first size surrounded by images of a second plurality of elements rendered in a second size that is smaller than the first size.

Control proceeds to block 804 in which the graphical user interface controlling application 114 receives a request to zoom in. The graphical user interface controlling application 114 erases (at block 806) one or more images. For example, the erasing of one or more images may include erasing images of a first plurality of elements rendered in a first size and images of a second plurality of elements rendered in the second size.

From block 806 control proceeds to block 808 in which the graphical user interface controlling application 114 displays images of the second plurality of elements rendered in the first size.

Figure 9:
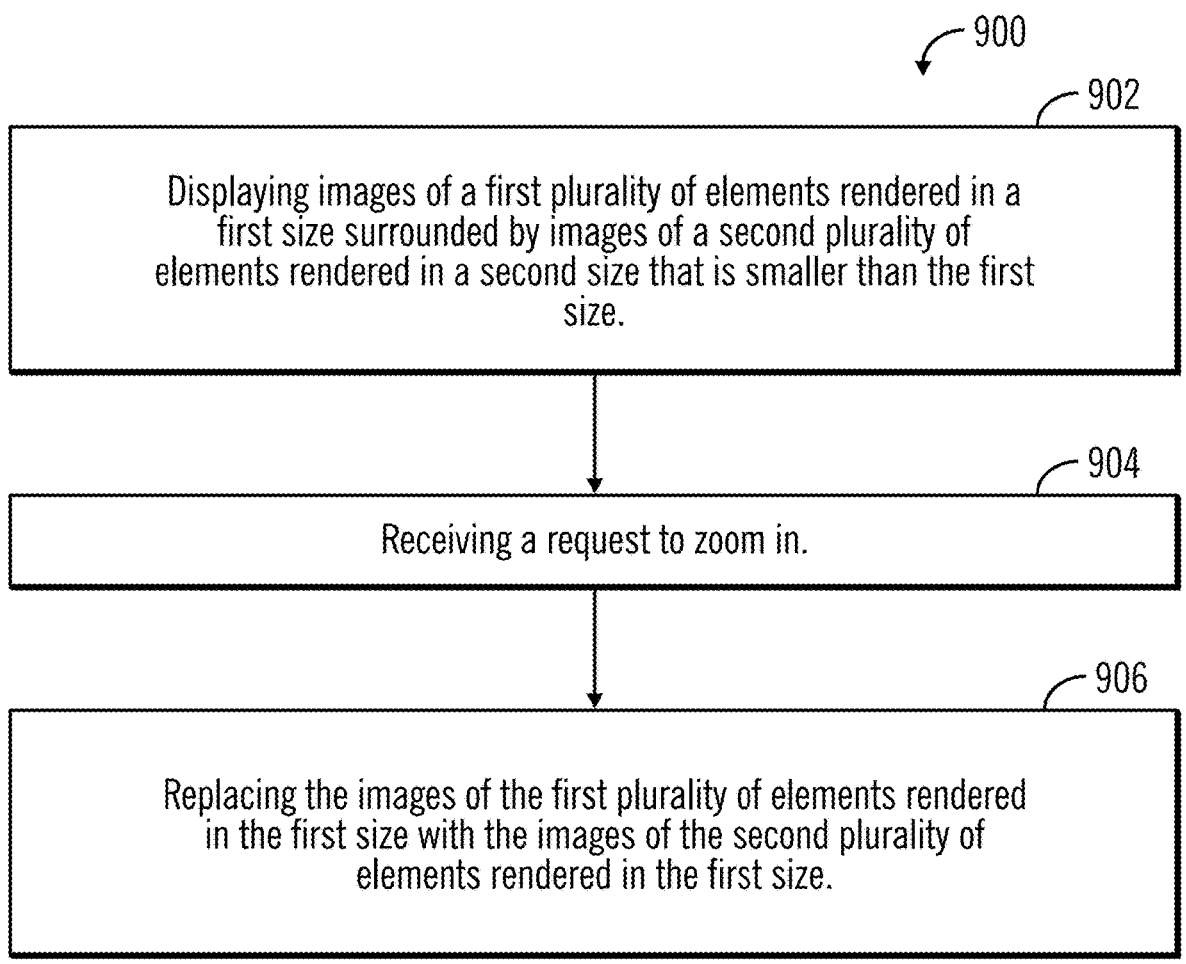
FIG. 9 illustrates a third flowchart that shows how images are moved and resized in response to a zoom in operation, in accordance with certain embodiments.

FIG. 9 illustrates a third flowchart 900 that shows how images are moved and resized in response to a zoom in operation, in accordance with certain embodiments. The operations shown in FIG. 9 may be performed by the graphical user interface controlling application 114 that executes in the computational device 102.

Control starts at block 902 in which the graphical user interface controlling application 114 performs the displaying of images of a first plurality of elements rendered in a first size surrounded by images of a second plurality of elements rendered in a second size that is smaller than the first size.

Control proceeds to block 904 in which the graphical user interface controlling application 114 receives a request to zoom in. The graphical user interface controlling application 114 replaces (at block 906) the images of the first plurality of elements rendered in the first size with the images of the second plurality of elements rendered in the first size.

Therefore, FIGS. 1-9 illustrate certain embodiments in which in response to a zoom in request from a user, a graphical user interface controlling application radially moves objects towards the center of a display screen and enlarges the objects during the process of moving the objects towards the center of the display screen.

Therefore, in certain embodiments provided in FIGS. 1-9 the functions of a computer system with a small screen (e.g., a smartphone) are improved by allowing a user to zoom out elements without losing detail of important visual information. In certain embodiments certain images are made to zoom out and fade to the center to arrange other images closer to the central area than the other images were before.

In a small screen (e.g., a smartphone) zoom in and zoom out interaction may be cumbersome as the screen may be too small and touch interaction may be difficult when visual elements are reduced in size. Certain embodiments allow radial zoom in and zoom out by providing mechanisms to touch a control at the center of the screen and this improves the functioning of a computer system with a small screen.

Conventional linear scrolling in a small screen computer system has limitations in displaying a large number of elements and illustrating the relationship between elements. The embodiments shown in FIGS. 1-9 improve the functioning of a small screen computer system by providing mechanisms for radial scrolling via which users may display and choose sections of elements that they wish to focus on.

The embodiments shown in FIGS. 1-9 also improve the functions for a small screen based computer system by providing mechanisms to show time-based information in which elements closer to the center may be more recent elements while at the same time displaying a large number of relevant elements on a small screen. The radial scrolling described in FIGS. 1-9 may therefore use a time dimension in addition to positional dimensions for zooming in and zooming out. In certain embodiments, scrolling may occur in a three dimensional space for improving a small screen computer system. Such embodiments improve the functioning of a small screen computer system.

ADDITIONAL EMBODIMENT DETAILS

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
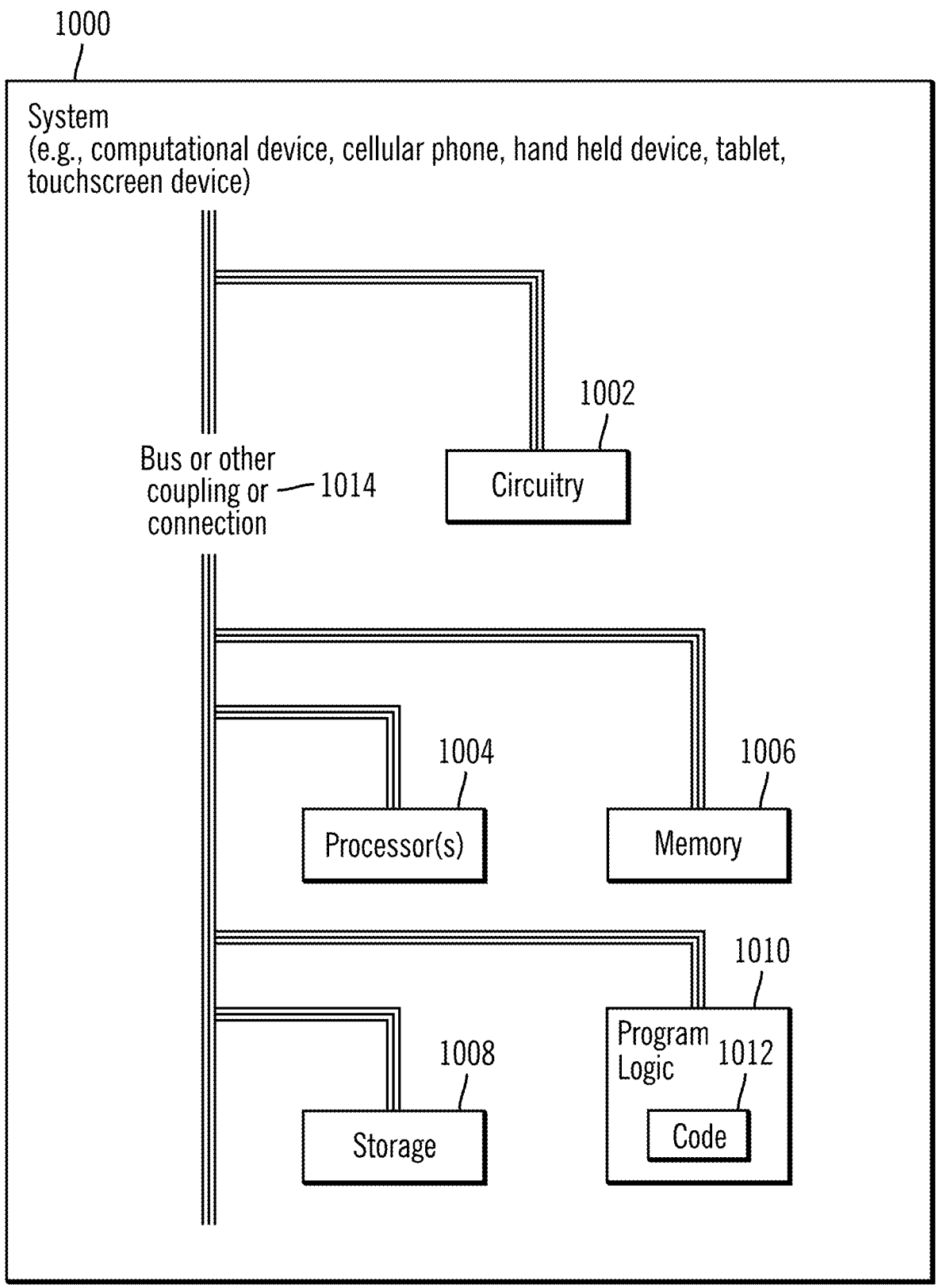
FIG. 10 shows certain elements that may be included in the computational device as described in FIGS. 1-9, in accordance with certain embodiments.

FIG. 10 illustrates a block diagram of a system 1000 that shows certain elements that may be included in the computational device 102 or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
a memory; and
a processor coupled to the memory, wherein the processor performs operations, the operations comprising:
in response to displaying images of a first plurality of elements rendered in a first size circumferentially surrounded by images of a second plurality of elements rendered in a second size that is smaller than the first size, receiving a request to zoom in, wherein a first data structure and a second data structure includes polar angles, polar radii, and sizes to represent an element prior to a zoom in and subsequent to a zoom in; and
in response to receiving the request to zoom in, performing:
assigning a second polar radius in the second data structure to be lesser than a first polar radius in the first data structure while maintaining identical polar angles in the first data structure and the second data structure to radially move corresponding images of the second plurality of elements to positions occupied by images of the first plurality of elements prior to the request to zoom in, wherein the images of the second plurality of elements are rendered in the first size;
rendering images of the first plurality of elements in a third size that is smaller than the first size; and
displaying the images of the first plurality of elements rendered in the third size, in a color having a relatively lower contrast with a background color in comparison to other displayed images, at a position represented by a third polar radius, wherein the third polar radius is lesser than the second polar radius, wherein displayed images of the second plurality of elements rendered in the first size circumferentially surround corresponding displayed images of the first plurality of elements rendered in the third size while maintaining identical polar angles.

2. The system of claim 1, wherein:
prior to receiving the request to zoom in, the images of the first plurality of elements rendered in a first size are placed at a first radial distance from an origin, and the images of the second plurality of elements rendered in a second size are placed at a second radial distance from the origin, wherein the second radial distance is greater than the first radial distance; and
in response to receiving the request to zoom in, the images of the second plurality of elements rendered in the first size are placed at the first radial distance from the origin.

3. The system of claim 1, the operations further comprising:
prior to receiving the request to zoom in, images of a third plurality of elements rendered in a third size surround the images of the second plurality of elements rendered in the second size, wherein the third size is smaller than the second size; and
in response to receiving the request to zoom in, further performing: replacing the images of the second plurality of elements rendered in the second size with the images of the third plurality of elements rendered in the second size.

4. The system of claim 1, wherein in response to receiving a request to zoom out, restoring displayed images to a state prior to receiving the request to zoom in.

5. A computer program product, the computer program product comprising a computer readable storage medium having computer readable program code embodied therewith, the computer readable program code configured to perform operations on a processor, the operations comprising:
in response to displaying images of a first plurality of elements rendered in a first size circumferentially surrounded by images of a second plurality of elements rendered in a second size that is smaller than the first size, receiving a request to zoom in, wherein a first data structure and a second data structure includes polar angles, polar radii, and sizes to represent an element prior to a zoom in and subsequent to a zoom in; and
in response to receiving the request to zoom in, performing:
assigning a second polar radius in the second data structure to be lesser than a first polar radius in the first data structure while maintaining identical polar angles in the first data structure and the second data structure to radially move corresponding images of the second plurality of elements to positions occupied by images of the first plurality of elements prior to the request to zoom in, wherein the images of the second plurality of elements are rendered in the first size;
rendering images of the first plurality of elements in a third size that is smaller than the first size; and
displaying the images of the first plurality of elements rendered in the third size, in a color having a relatively lower contrast with a background color in comparison to other displayed images, at a position represented by a third polar radius, wherein the third polar radius is lesser than the second polar radius, wherein displayed images of the second plurality of elements rendered in the first size circumferentially surround corresponding displayed images of the first plurality of elements rendered in the third size while maintaining identical polar angles.

6. The computer program product of claim 5, wherein:
prior to receiving the request to zoom in, the images of the first plurality of elements rendered in a first size are placed at a first radial distance from an origin, and the images of the second plurality of elements rendered in a second size are placed at a second radial distance from the origin, wherein the second radial distance is greater than the first radial distance; and in response to receiving the request to zoom in, the images of the second plurality of elements rendered in the first size are placed at the first radial distance from the origin.

7. The computer program product of claim 5, the operations further comprising:

prior to receiving the request to zoom in, images of a third plurality of elements rendered in a third size surround the images of the second plurality of elements rendered in the second size, wherein the third size is smaller than the second size; and in response to receiving the request to zoom in, further performing: replacing the images of the second plurality of elements rendered in the second size with the images of the third plurality of elements rendered in the second size.

8. The system of claim 1, wherein the images are two-dimensional images of objects displayed on a display screen.

9. The system of claim 1, wherein positions of the first plurality of elements and the second plurality of elements are represented in a polar coordinate system.

10. The system of claim 9, wherein a position of an element is represented by a polar angle and a polar radius in the polar coordinate system.

11. The system of claim 10, wherein on zooming in on the element to move the element from a first position to a second position, the polar angle remains unchanged from the first position to the second position and the polar radius diminishes in size in the second position in comparison to the first position.

12. The computer program product of claim 5, wherein the images are two-dimensional images of objects displayed on a display screen.

13. The computer program product of claim 5, wherein positions of the first plurality of elements and the second plurality of elements are represented in a polar coordinate system.

14. The computer program product of claim 13, wherein a position of an element is represented by a polar angle and a polar radius in the polar coordinate system.

15. The computer program product of claim 14, wherein on zooming in on the element to move the element from a first position to a second position, the polar angle remains unchanged from the first position to the second position and the polar radius diminishes in size in the second position in comparison to the first position.

16. The computer program product of claim 5, wherein in response to receiving a request to zoom out, restoring displayed images to a state prior to receiving the request to zoom in.

* * * * *